United States Patent [19]

Abromaitis

[11] Patent Number: 4,763,696
[45] Date of Patent: Aug. 16, 1988

[54] WELD JOINT FOR SOOT BLOWER LANCE TUBE

[75] Inventor: Andre T. Abromaitis, Erie, Pa.

[73] Assignee: White Consolidated Industries, Inc., Cleveland, Ohio

[21] Appl. No.: 17,893

[22] Filed: Feb. 24, 1987

[51] Int. Cl.⁴ .............................................. F16L 13/04
[52] U.S. Cl. .................................... 138/155; 285/286
[58] Field of Search ............. 15/316 R; 138/109, 155; 228/141.1, 142, 173.4; 285/286

[56] References Cited

U.S. PATENT DOCUMENTS

| | | | |
|---|---|---|---|
| 2,034,808 | 3/1936 | Graham | 285/286 |
| 4,387,481 | 6/1983 | Zalewski | 15/316 R |
| 4,629,218 | 12/1986 | Dubois | 138/177 X |

Primary Examiner—Mark J. Thronson
Attorney, Agent, or Firm—Schweitzer & Cornman

[57] ABSTRACT

A soot blower lance tube having coaxially aligned sections and weld material joining the sections.

4 Claims, 4 Drawing Sheets

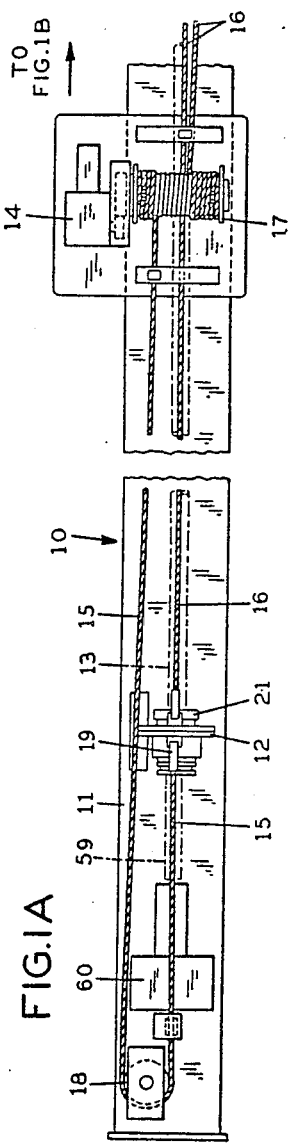
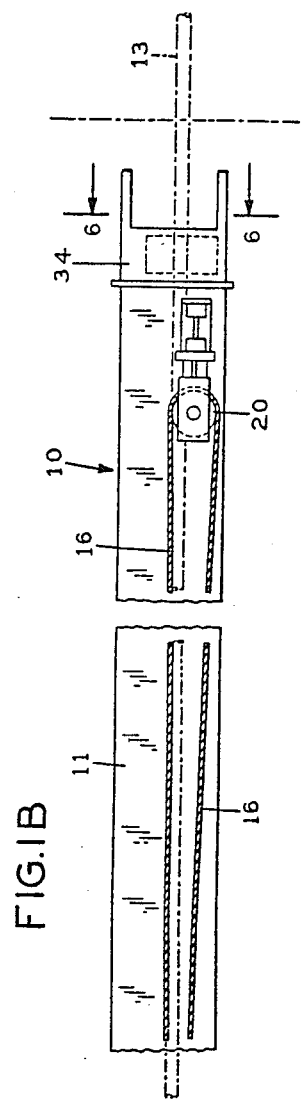
FIG.1A
FIG.1B

WELD JOINT FOR SOOT BLOWER LANCE TUBE

BACKGROUND AND SUMMARY OF THE INVENTION

The invention is directed to a soot blower for cleaning the interior surfaces of a boiler by discharging a suitable cleaning fluid such as air, water or steam from a nozzle or nozzles arranged at one end of a rotatable and retractable lance tube and toward said boiler surfaces. More particularly, the invention relates to a new and improved transition weld between a "heavier" wall section and a "thinner" wall section of the lance tube.

Typically, in a soot blower of the long retracting type, a lance tube is moved through a long, e.g., 55 foot path of travel horizontally forward into the heat exchange zone of a large public utility boiler. During the traveling motion of the lance tube, the tube is rotated about its longitudinal axis and a cleaning fluid is discharged through a nozzle or nozzles mounted at the forwardmost end of the tube so that the fluid may be directed against various internal surfaces of the boiler to remove undesirable soot accumulations. In a conventional soot blower, the lance tube is mounted on a traveling carriage which securely mounts one end of the lance tube and which is operable to impart the translatory and rotational movement to the lance tube and guide the long lance tube as it enters and leaves the boiler.

As illustrated and described in more detail below, the physical arrangement between the lance tube, traveling carriage and other components of the soot blower requires the lance tube to be of a uniform outer diameter for its entire length of up to 55 feet. The long cantilever configuration of the lance tube within the soot blower necessitates proper selection of diameter and wall thickness to minimize both bending stress caused by the cantilever configuration and torsional stress caused by the torque generated about the one supported end of the lance tube. Typically, the lance tube comprises two or more hollow, tubular sections of varying wall thicknesses. The sections are arranged relative to one another such that the section having the thinnest wall section is located at the unsupported end of the lance tube to reduce weight and minimize stress on the lance tube and the section having the thickest wall section is located at the end of the lance tube supported by the traveling carriage for maximum strength.

It is a primary objective of the present invention to provide a new and improved transition weld of a thicker wall section to a thinner wall section while maintaining a uniform outer diameter for the entire length of the lance tube as well as a smooth surface throughout the interior of the lance tube. In accordance with conventional practice, the smooth internal surface is accomplished by machining the heavy wall inner diameter to match the thin wall inner diameter. However, a problem associated with the conventional transition is that the internal grinding required after grinding to provide a smooth internal surface is difficult to control because it is performed at locations ten to thirty feet within a 4 to 5 inch diameter lance tube. Consequently, the difficult to control grinding very often reduces the cross section of the thin wall section unacceptably below the original inner diameter of the thin wall tube.

Pursuant to the invention, the end of the thin wall section to be welded to the thick wall section is formed by swaging or other suitable means. In this manner, the inner diameter of the thin wall section is arranged to match the inner diameter of the thick wall section at the transition area and weld filler is utilized to achieve a uniform outer diameter between the thick wall section and the formed end of the thin wall section. It has been discovered through empirical testing that the stress developed about the transition weld in accordance with the invention is considerably less than the stress about a conventional transition weld joint. Accordingly, the invention provides a weld transition that is inherently more suitable to secure two tubular sections under both bending and torsional stress to one another than the heretofore utilized conventional weld.

In addition, it should be understood that the lance tube operates in a high temperature environment within the boiler. The cleaning fluid passing through the lance tube cools the lance tube, particularly the section closest to the traveling carriage, inasmuch as the cleaning fluid is coolest and more able to absorb heat when it first enters the lance tube. Accordingly, it is common to use a material for the thick wall section mounted to the traveling carriage different than the material used for the thin wall section at the free, nozzle end of the tube. The material for the thin wall section generally comprises an alloy having a higher tensile strength at higher temperatures than the alloy utilized for the thick wall section. An important additional advantage of the invention is that the thick wall section is not machined down to match the inner diameter of the next thinner wall section. Therefore, the thick wall section is generally uniformly of the same wall thickness throughout its entire length and not susceptible to a critical weak point due to a declining tensile strength at high temperatures near the transition as might occur with the conventional machined, reduced thickness end of the thick wall section, as will appear.

Thus, the present invention provides a highly advantageous improvement in the construction of multi-section lance tubes for soot blowers of the long retracting type. The transition weld of the invention is easier to achieve, inherently better able to endure bending and torsional stress and subject to improved tensile strength within the high temperature environment of its operation. Accordingly, a lance tube built in accordance with the teachings of the invention will be much more resistant to a primary problem of soot blower operation, i.e., the bending or breaking off of the lance tube within the boiler, usually at the weld joint.

For a better understanding of the above and other features and advantages of the invention, reference should be made to the following detailed description of a preferred embodiment of the invention and to the accompanying drawings.

BRIEF DESCRIPTION OF THE DRAWINGS

FIGS. 1A and 1B together illustrate a plan view of a soot blower of the long retracting type.

DETAILED DESCRIPTION OF A PREFERRED EMBODIMENT OF THE INVENTION

Figure 2A:
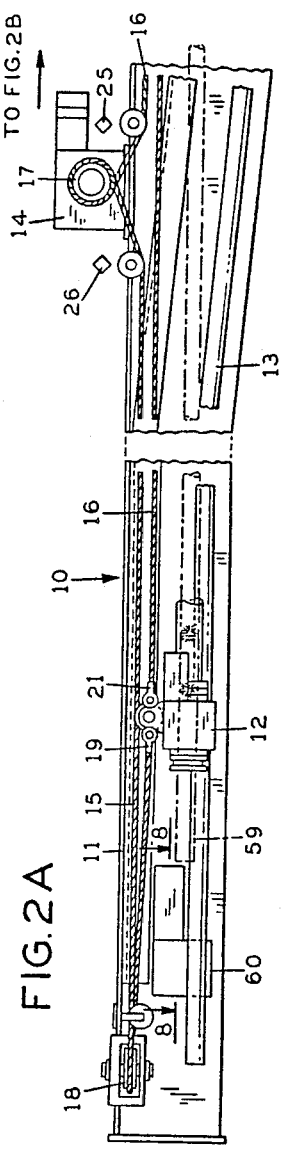
FIGS. 2A and 2B when taken together provide a side view of the soot blower of FIGS. 1A and 1B.

Referring now to the drawings, and initially to FIGS. 1A, B and 2A, B, there is illustrated an example of a soot blower generally indiciated by the reference numeral 10. The illustrated soot blower is built in accordance with the advantageous teachings of U.S. Pat. No. 4,387,481 issued June 14, 1983 which is hereby expressly incorporated by reference. The soot blower 10 includes a main support frame 11 which defines a long, housing-type channel to mount a horizontally movable traveling carriage 12. The traveling carriage 12, in turn, rotatably supports a long, hollow rotatable lance tube 13 such that horizontal movements of the carriage 12 will advance the lance tube 13 through a working motion and return. The housing 11 is mounted adjacent the heat exchange portions of a large public utility boiler (not specifically illustrated) in a well known manner with the lance tube 13 being arranged and configured to travel from the housing 11 to the interior portions of the boiler to perform a soot removal operation, as discussed above. A revolving roller assembly 73 is mounted at the forwardmost end of the housing 11 to support and guide the lance tube 13 as it travels into and out of the boiler.

Horizontal motion is imparted to the traveling carriage 12 by a cable drive system generally comprising a traversing drive assembly 14 and first and second drive cables 15, 16. The first drive cable 15 includes an end fastened to a rotatable drum 17 of the drive assembly 14 and is wrapped around the drum 17 through several complete turns. The cable 15 extends from the drum to an idler pulley 18 which is adjustably fastened to the rear wall of the main support frame 11. The adjustment of the idler pulley 18 may be accomplished by any suitable known mechanical expedient which permits the idler pulley 18 to be selectively fixed in a predetermined horizontal position. In the illustrated embodiment, a sheave box assembly with a rear adjusting screw is utilized to adjustably mount an idler pulley 18 to the housing structure 11. The idler pulley 18 may therefore function as a cable tensioner to maintain the drive cable 15 in a taut condition. The cable 15 extends from the idler pulley to a rigid connection by cable connector 19 to the traveling carriage 12.

Figure 2B:
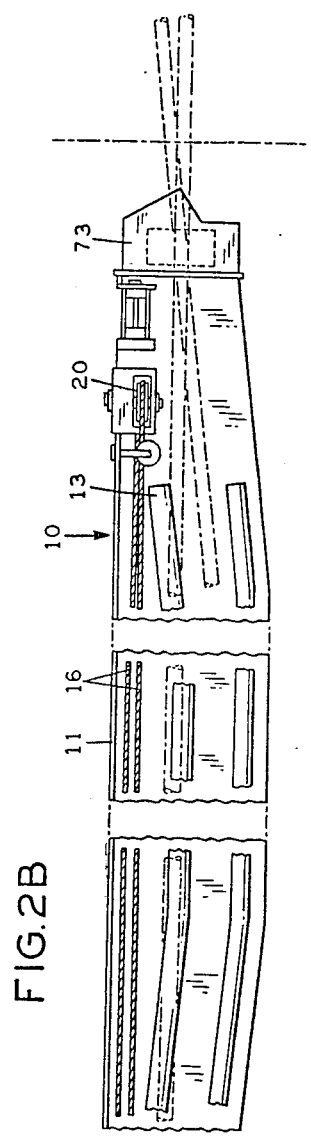

In a similar manner, the second drive cable 16 is mounted to the rotatable drum 17 and extends after several turns around the drum 17 from the drum 17 to a second idler pulley 20 adjustably mounted at the forwardmost end of the main support structure 11. From the second idler pulley 20 the cable 16 continues to a rigid connection via cable connector 21 to the traveling carriage 12. As clearly illustrated in FIGS. 1 and 2, the drive cables 15, 16 are connected to the traveling carriage 12 whereby they form a 180° angle with respect to one another. In this manner, the second drive cable 16 may be utilized to pull the traveling carriage 12 in a forward direction and the first drive cable 15 may act to pull the traveling carriage in a reverse direction.

As should be understood, counter-clockwise rotation of the cable drum 17 by the motor 23 will wind the second cable 16 onto the drum causing the second cable 16 to pull the traveling carriage 12 in a forward direction to advance the lance tube 13 into the boiler. Clockwise rotation of the rotatable cable drum 17 will have the opposite effect, that is, to pull the first cable 15 onto the drum whereby the first cable 15 will pull the traveling carriage 12 in a reverse direction to retract the lance tube 13 from the boiler. In either rotational direction of the cable drum 16, the non-pulling cable will unwind from the drum in an amount equal to the amount that the pulling cable is being wound onto the drum so that the end of the non-pulling cable fastened to the traveling carriage 12 will move the carriage and not resist the pulling efect of the then pulling cable.

Figure 3:
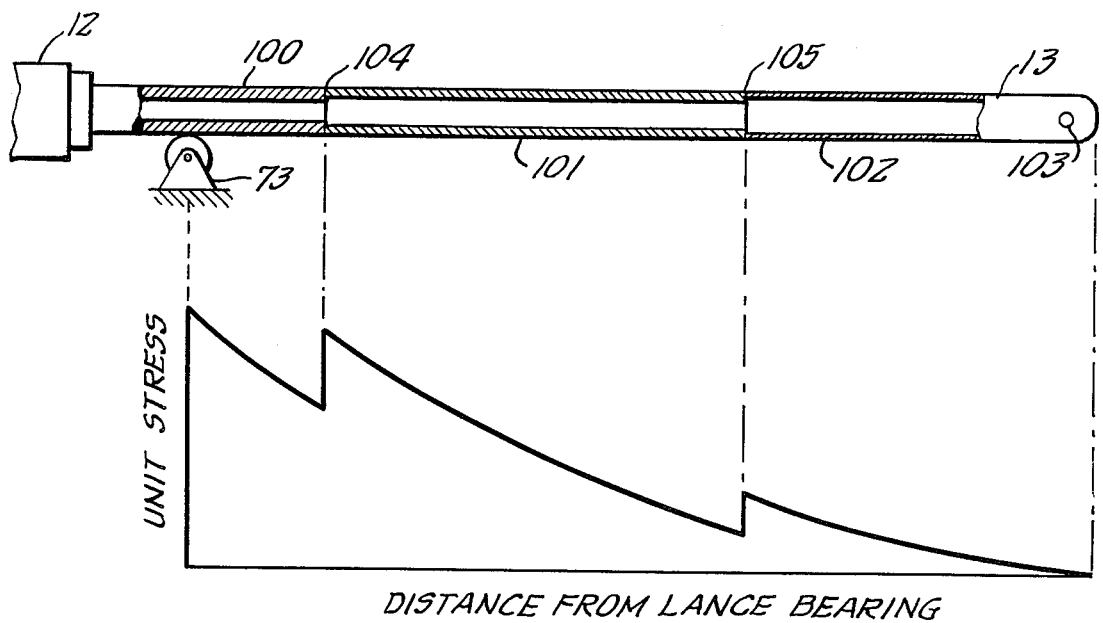
FIG. 3 is a side cross sectional view of the lance tube of the soot blower illustrated in FIGS. 1A and 1B and 2A and 2B, including a bending stress graph.

As discussed above, the lance tube 13 is as long as 55 feet in length and, accordingly, developes a considerable amount of bending stress when the unsupported end is moved to its furtherest position within the boiler, as illustrated in FIG. 3. In order to minimize the stress while maintaining adequate structural strength for the lance tube 13, the lance tube 13 comprises several tubular sections 100, 101, 102 having varying wall thicknesses. The several sections 100, 101, 102 are welded to one another, as will appear, and are arranged so that the thickest wall section 100 is supported by the traveling carriage 12 with subsequent sections 101, 102 having progressively thinner wall thicknesses to the thinnest wall section 102 arranged at the end of the lance tube 13 mounting the nozzle 103. The thin wall of the section 102 reduces the amount of weight contributed by the end portion of the lance tube 13. Moreover, the thick wall of the section 100 provides extra strength at the portions of the lance tube 13 that are engaged and supported by the traveling carriage 12 and revolving roller assembly 73 and which must absorb the greatest amount of stress.

Referring to the graph portion of FIG. 3, it should be understood that the amount of stress on the lance tube 13 is designed to be highest at the revolving roller assembly 73 since this portion is coolest as described earlier, and generally, gradually decreases to approximately zero at the nozzle 103. It should be noted, however, that the unit stress spikes upwardly at each of the transition welds 104, 105 between the tubular sections 100, 101, 102 of the lance tube 13. Thus, the strength and integrity of the transition welds 104, 105 is of critical importance. The criticality of the weld strength is made somewhat problematic due to the requirement that the weld be formed between sections 100, 101, 102 of different wall thicknesses. Moreover, due to the translatory movement of the lance tube 13 over the revolving roller assembly 73, it is necessary to maintain a smooth outer surface for the lance tube 13. In addition, it is desirable to provide a smooth internal surface within the lance tube 13 to facilitate minimum turbulance in the flow of the cleaning fluid passing through the lance tube 13 to the nozzle 103.

Figure 4:
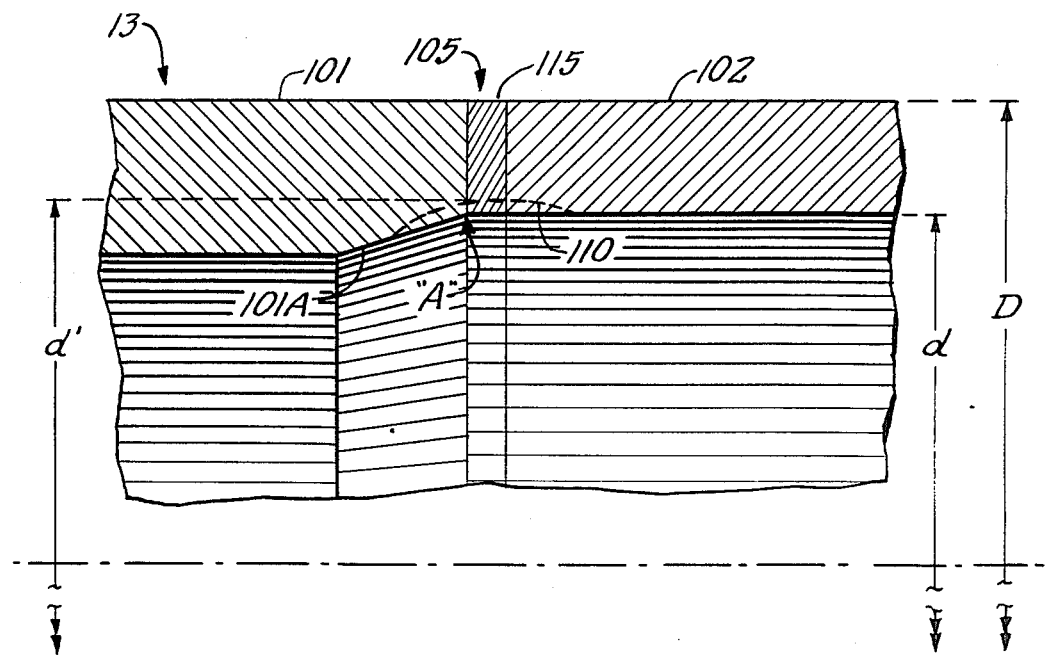
FIG. 4 is a partial side cross sectional view of the transition weld between two sections of the lance tube of FIG. 3 in accordance with a conventional transition weld joint.

In accordance with the conventional practice, the transition weld is achieved by machining down the end 101A of the thicker wall section 101 to match the wall thickness of the subsequent thinner wall section 102, as illustrated in FIG. 4. Weld filler material 115 is utilized to bond the two sections 101, 102 together with the outer surfaces of the adjacent sections being arranged in a flush relation to one another to provide a smooth outer surface for the lance tube 13. In order to achieve a smooth internal surface within the lance tube 13, the transition weld area 110 within the tube is ground to remove and smooth down weld filler material as well as material from each of the tube sections 101, 102. As discussed above, the grinding down of the weld area 110 very often reduces the thickness of the thinner wall section 102 below acceptable levels and thereby reduces the strength of the transition area 110 at a region of crictical stress. This is a primary problem of the conventional weld practice. Furthermore, the conventional weld itself is more prone to stress, even notwithstanding the grinding problem, as will be discussed below.

Figure 5:
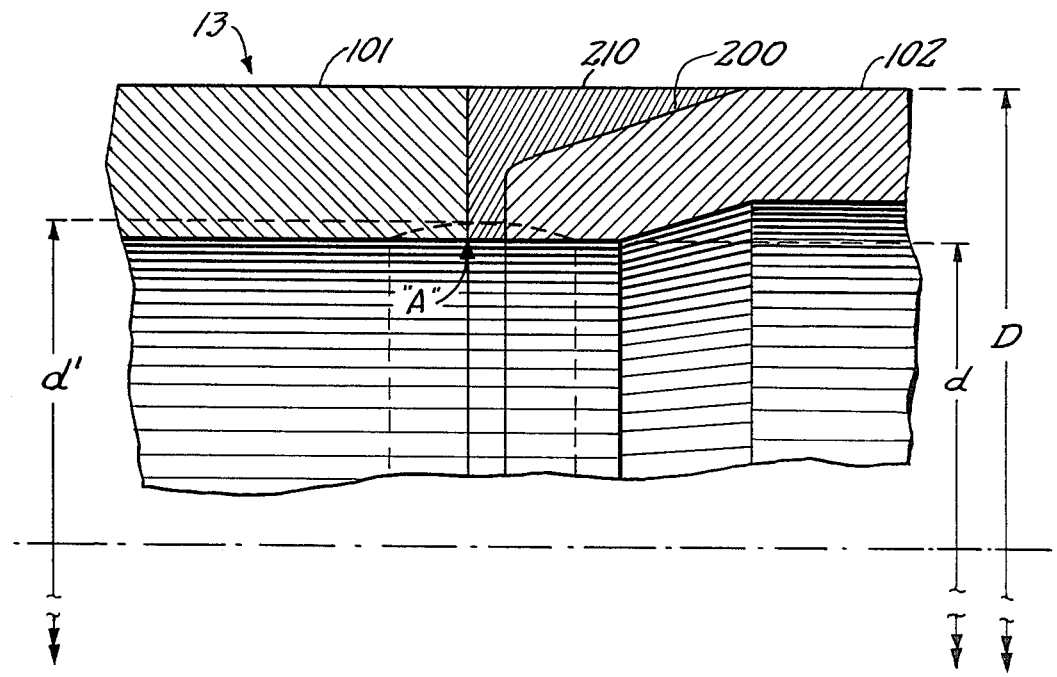
FIG. 5 is a partial side cross sectional view of the transition weld between two sections of the lance tube of FIG. 3 in accordance with the improved formed and welded transition joint of the invention.

Referring now to FIG. 5, the present invention teaches a new and improved transition weld that is inherently less prone to stress and which eliminates the grinding problem of the prior art. In accordance with the invention, the end 200 of the thin wall section 102 is formed such that the end 200 is tapered to match the inner diameter of the thick wall section 101. Weld filler material 210 is applied both between the sections 101 and 102 and over the formed end 200 of the thin wall section 102 to provide a continuous smooth surface at the exterior of the lance tube 13.

A stress calcuation may be completed with respect to the transition welds of each of FIGS. 4 and 5 to illustrate the improved bending stress environment achieved with the swaged end transition according to the invention.

Bending stress is given by the formulas:

$$S = \frac{Mc}{I}$$

Where:
S=bending stress (PSI)
M=bending moment (In−lbf)
C=distance to outermost fiber, R (In)
I=Moment of Inertia=(K·In$^4$) (with K given as 0.049)=0.049. (D (outer diameter)$^4$−d (inner diameter $^4$))

In each example, we will assume that the wall thickness of the thicker wall 101 is 0.50″, the wall thickness of the thinner wall 102 is 0.375″ and the outer diameter of the lance tube 13 (indicated by D in each of FIGS. 4 and 5) is 4.00″. The example also assumes that the allowable reduction in wall thickness due to grinding is 0.03″. The inner diameter at the transition weld is indicated in each of FIGS. 4 and 5 as d and the effective inner diameter at the transition weld, based on reduction due to grinding, as d′.

Calculation for FIG. 4:
D=4.00″
d=3.25″
and
d′=3.25″+2(0.03)=3.31″
Accordingly, I=0.49(4.00$^4$-3.31$^4$)=6.66
Thus, S$_{FIG. 4}$=0.15 MC Calculation for FIG. 5:
D=4.00″
d=(4.00″−2(0.5″)=3.00″
and
d′=3.00″+2(0.03)=3.06″
Accordingly, I=0.49(4.00$^4$-3.06$^4$)=8.25
Thus, S$_{FIG. 5}$=0.12 MC From the above calculations it can be seen that the stress at the conventional transition weld of FIG. 4 is 24% greater than the stress at the transition weld according to the invention illustrated in FIG. 5. As should be understood from the stress formulas, the stress is inversely proportional to the moment of inertia which is in turn a function of the wall thickness at the transition.

The formed end 200 of the thinner wall section 102 reduces the inner diameter of the lance tube 13 at the transition weld, to provide a thicker effective wall thickness at the critical weld area. The above discussion of the formed and welded transition joint with respect to sections 101 and 102 is, of course, also applicable to the weld joint of sections 100 and 101.

Another significant advantage of the invention relates to the high temperature environment within which the lance tube 13 operates. Typically, the lance tube 13 is exposed to gas temperature in excess of 2500° F. As discussed above, the cleaning fluid acts as a coolant to maintain the temperature of the lance tube 13 at a temperature low enough to insure reliable operation. The section 100 nearest the traveling carriage 12 is exposed to operating temperatures that are lower than the other sections 101, 102 inasmuch as the cleaning fluid is cooler and able to absorb more heat when it first enters the lance tube 13. For example, the cleaning fluid may be steam at 500° F. as it first enters the section 100. The temperature of the steam may rise to approximately 900° F. by the time it flows through the furthest section 102.

Figure 6:
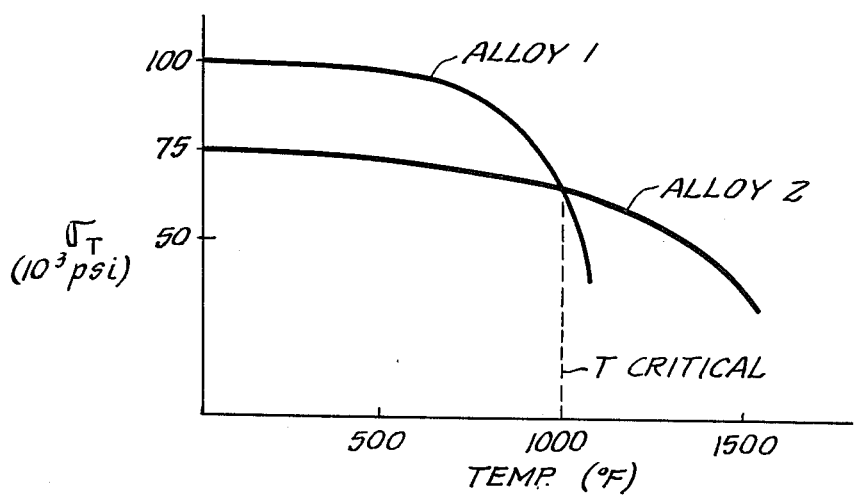
FIG. 6 is a graph illustrating tensile strength v. temperature for different materials used for the various sections of the lance tube of FIG. 4.

Accordingly, the several sections 100, 101, 102 of the lance tube 13 are generally made from different materials in accordance with the temperature of operation of the particular section 100, 101, 102. Referring to FIG. 6, there is illustrated in graph form the tensile strength v. temperature for two alloys. Alloy 1 exhibits higher tensile strength at temperatures below 1000° F. and would be used, for example, in the manufacture of the thick wall section 100. Alloy 2 exhibits improved tensile strength at temperatures above 1000° F. and would be used in the next thinner wall section 101.

At a temperature of approximately 1000° F. ($T_{critical}$ in FIG. 6) the tensile strength of Alloy 1 drops to the same value as the tensile strength of Alloy 2. Above this critical temperature Alloy 2 is intrinsically stronger than Alloy 1 and the weakest point occurs at location "A", as indicated in FIGS. 4 and 5. By using the improved formed and welded joint design of the invention, this weakest point is strengthened significantly by maintaining the 0.5″ wall thickness of section 101 at location "A".

Thus, the present invention provides a novel and highly improved transition weld configuration for the sections of a lance tube. The improved formed and welded transition inherently reduces the stress developed about the transition area. Moreover, the full thickness of the wall of the thick wall section at the critical end of the section affords improved tensile strength for the section at the high temperature of operation. The invention therefore provides a more durable long lance tube capable of efficient operation for an extended work life.

The above described preferred embodiment of the invention is meant to be representative only as certain changes therein may be made by persons skilled in the art without departing from the clear teachings of the invention. Accordingly, reference should be made to the following appended claims in determining the full scope of the invention.

I claim:
1. In a soot blower lance tube comprising at least an inner and an outer, hollow tubular section, each of equal outer diameter and welded to one another end-to-end, the inner one of said sections having a wall thickness which is greater than the wall thickness of the outer one of said sections, the improvement characterized by:
  (a) the inner end extremity of said outer section being deformed radially inwardly in a convergent taper, whereby the inside diameter of said outer section, at its innermost end extremity, substantially matches the inside diameter of said inner section at its outermost extremity,
  (b) said sections being coaxially aligned in closely spaced, non-overlapped relation, and
  (c) weld material joining said sections,
  (d) said weld material extending between said sections over substantially the full wall thickness of said inner section and extending axially outward along the convergent external surfaces of the inner end extremity of said outer section,
  (e) said sections being joined exclusively by said weld material.

2. The improvement of claim 1, further characterized by
  (a) said inner and outer tubular sections being formed of different alloys.

3. The improvement of claim 1, further characterized by
  (a) the outermost extremity of said inner section being formed substantially flat and square to the axis of the section.

4. The improvement of claim 1, further characterized by
  (a) the endmost portion of the convergently deformed inner end of said outer section, at its innermost extremity being of reduced wall thickness.

* * * * *